Jan. 1, 1952     R. L. KENNGOTT     2,581,109
COMPOSITE CAM AND CAM FOLLOWER MECHANISM
Filed Nov. 21, 1950     6 Sheets—Sheet 1

Inventor
ROBERT L. KENNGOTT

Edward F. Roe
Attorney

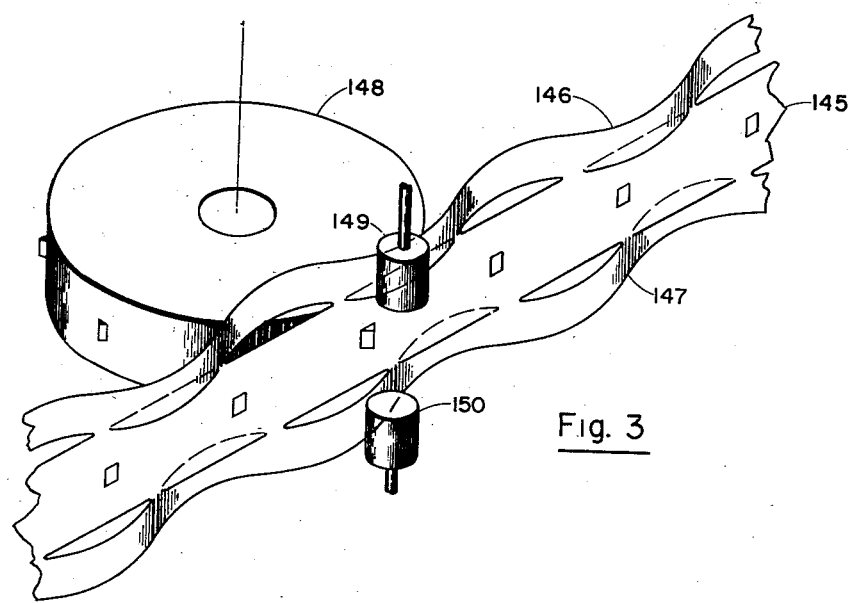
Fig. 3
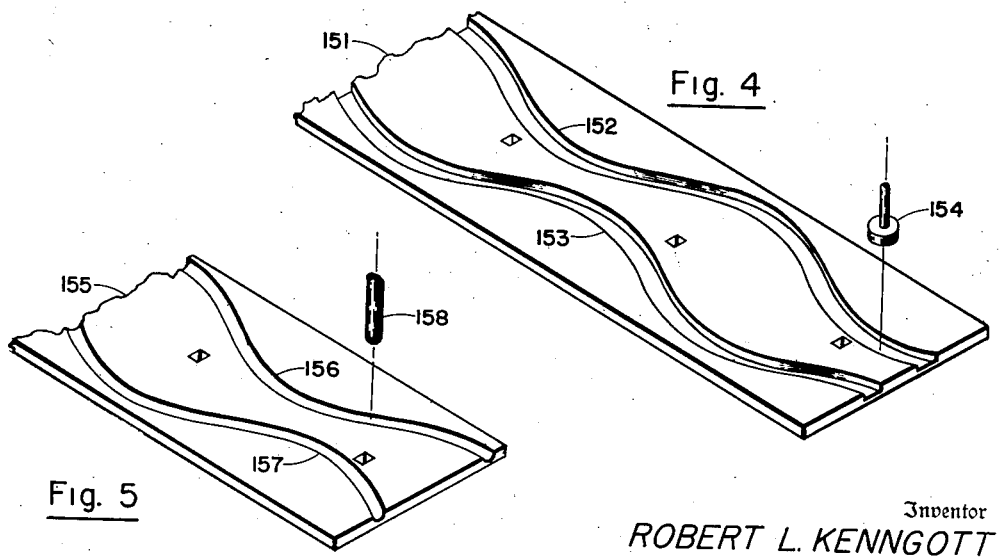
Fig. 4
Fig. 5
Inventor
ROBERT L. KENNGOTT
By Edward G. Roe
Attorney

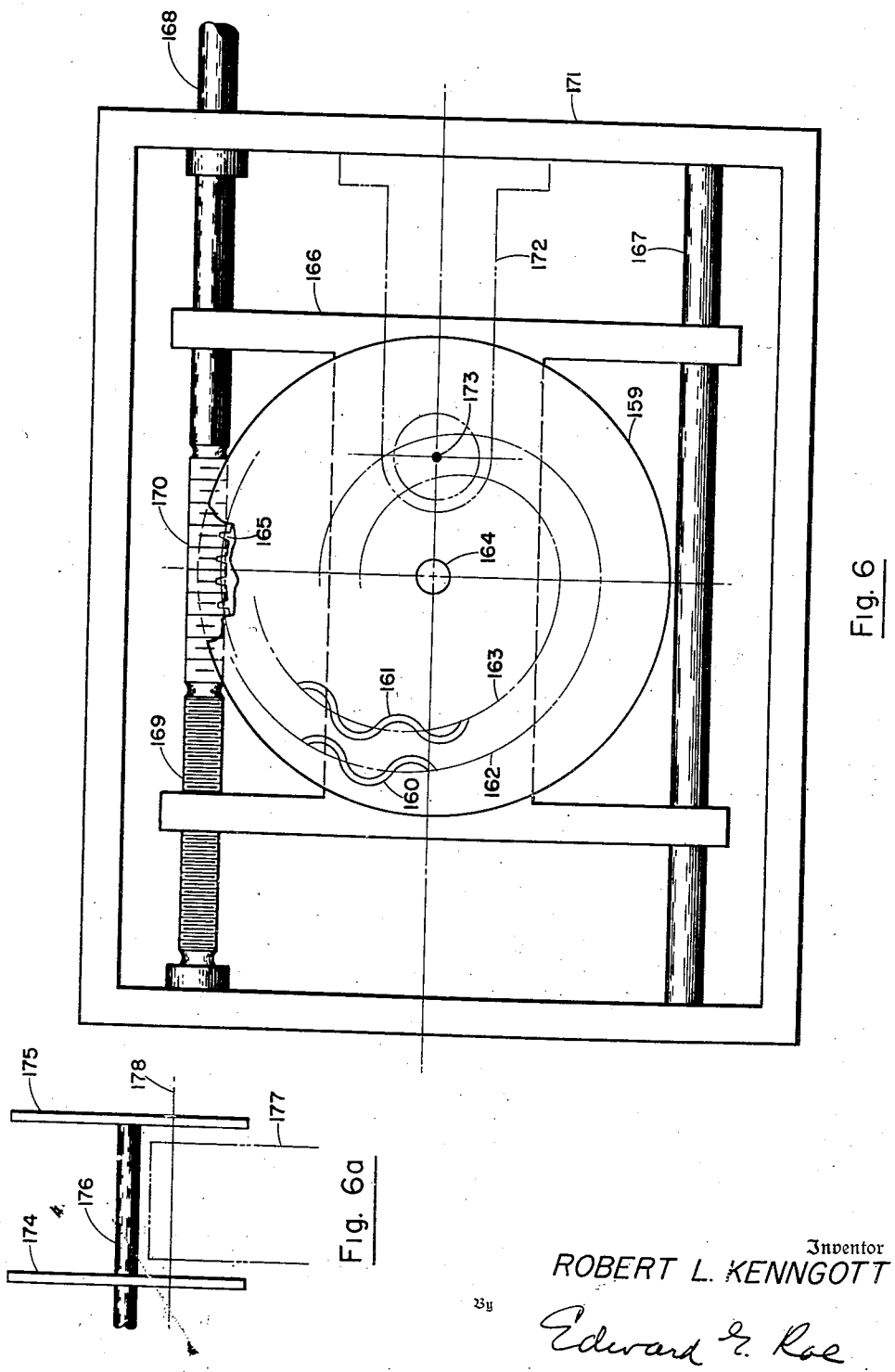

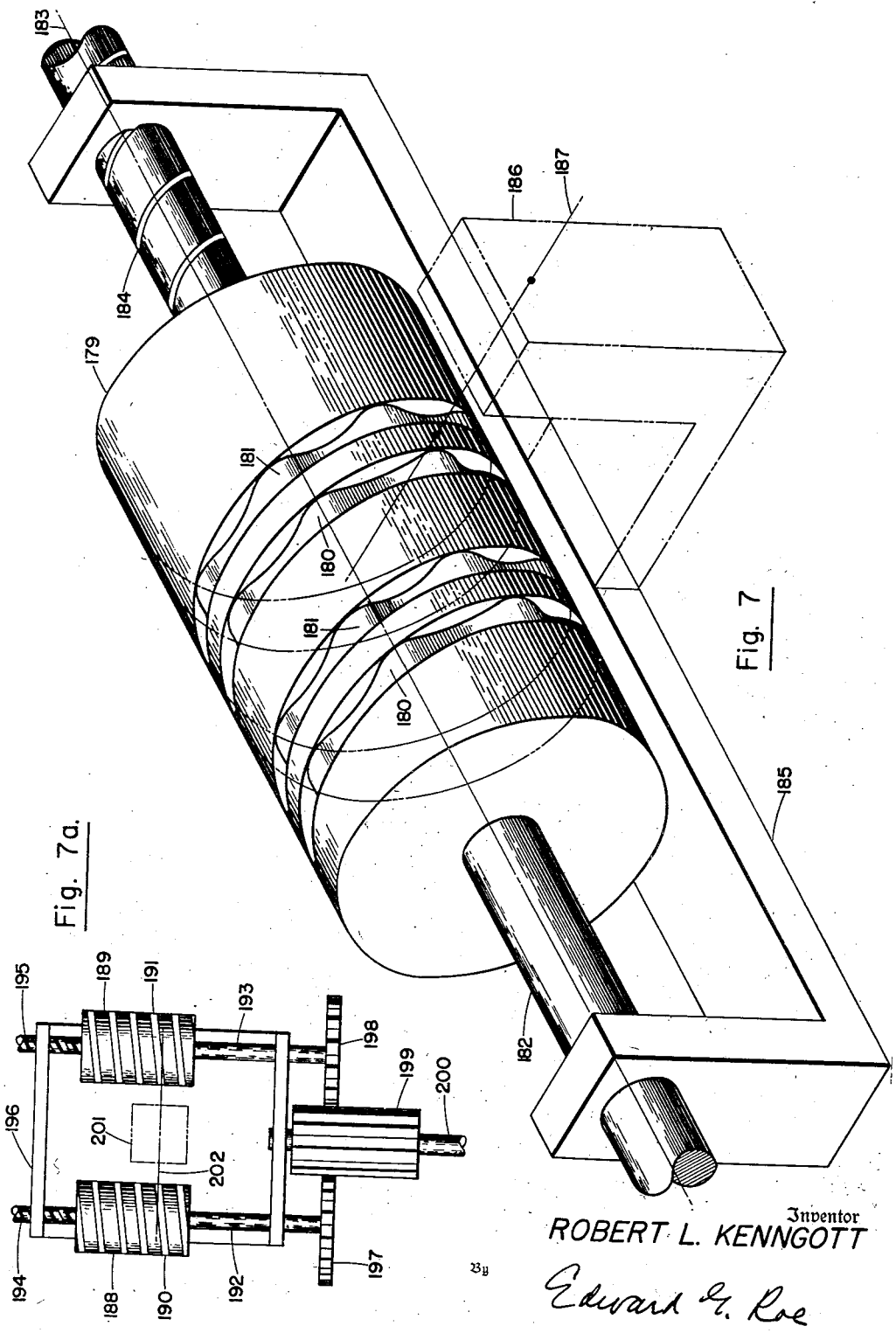

Jan. 1, 1952  R. L. KENNGOTT  2,581,109
COMPOSITE CAM AND CAM FOLLOWER MECHANISM
Filed Nov. 21, 1950  6 Sheets-Sheet 5

Inventor
ROBERT L. KENNGOTT
By Edward F. Roe
Attorney

Jan. 1, 1952   R. L. KENNGOTT   2,581,109
COMPOSITE CAM AND CAM FOLLOWER MECHANISM
Filed Nov. 21, 1950   6 Sheets-Sheet 6
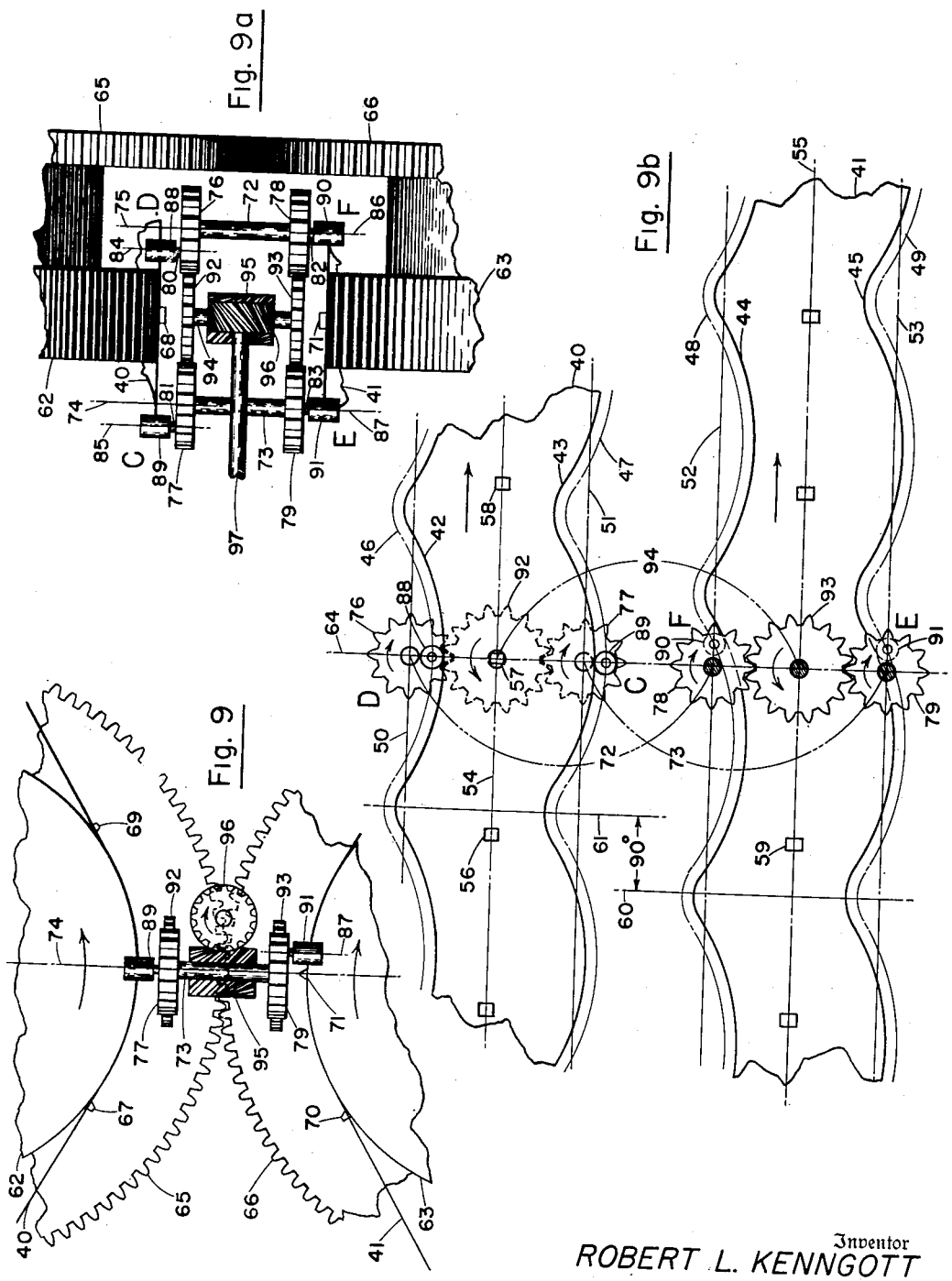
Inventor
ROBERT L. KENNGOTT
By Edward G. Roe
Attorney Patented Jan. 1, 1952

2,581,109

UNITED STATES PATENT OFFICE 2,581,109

COMPOSITE CAM AND CAM FOLLOWER MECHANISM

Robert L. Kenngott, Pleasantville, N. Y.

Application November 21, 1950, Serial No. 196,763

23 Claims. (Cl. 74—1)

In general, this invention relates to instrument mechanism and has particular reference to computing mechanism employed in the manner of a cam and cam follower for transmission of mechanical motion according to such non-uniform mathematical function or law of motion as may be prescribed.

In the art of mechanical computation, a mathematical function of a single variable is commonly mechanized by means of a cam and cam follower wherein the cam body bears in contour a geometrical representation of the prescribed function and wherein mechanical displacement of the cam body produces a corresponding displacement of the cam follower in a manner directly analogous to the behavior of independent and dependent variables, respectively, of said mathematical function.

For a concise summary of the types and properties of computer cams, reference is made to section 1.7, pp. 19-23, of "Computing Mechanisms and Linkages" by A. Svoboda, vol. 27 of the Massachusetts Institute of Technology Radiation Laboratory Series published by McGraw-Hill Book Co., Inc., New York city.

In nearly all applications, particularly with respect to computing mechanism, the problem of cam design consists in maximizing what may be called the capacity/accuracy ratio of the cam. Let unit accuracy be defined as the smallest increment of follower motion within which the cam action can be reliably determined. Then, the capacity/accuracy ratio is the total number of these elementary units of accurate motion contained in the full capacity or span of follower displacement provided by the cam contour. The advantage of a high capacity/accuracy ratio is apparent from the fact that a cam with a capacity/accuracy ratio of 10,000/1 is capable of representing a mathematical function in four decimal places, one of 100,000/1 in five decimal places, and so on.

Ordinary cams, whether plane or cylindrical, usually employ a cam contour in the form of a polar graph of the prescribed mathematical function. Driving motion is a rotation of the cam body through the angular co-ordinate of the polar contour, and follower motion approximates displacement in either a radial or an axial co-ordinate. Cam capacity is limited by practical considerations of size, in both manufacture and use. Accuracy is limited by the precision of manufacture. Representative of such cams would be a capacity/accuracy ratio of about 1000/1. A modified polar cam has been devised to expand the driving motion and reduce cam slope by employing a contour in the form of a multiple-convolution helix but seldom results in a better capacity/accuracy ratio than 1000/1 in the follower motion.

A second and distinct class of helical cam with expanded follower motion as well as expanded driving motion may provide a capacity/accuracy ratio of the order of 10,000/1. In such cams, the driving motion is a rotation of the cam body; and the follower motion is produced by various metering mechanism as an integrated distance measured along the helical cam contour. Spiral gear cams and belt cams are of this type.

Recently, a third class of cam has been developed which may be called the "code-track cam," having nearly unlimited capacity/accuracy ratio. Such cams represents a mathematical function by means of numerical information symbolically enscribed as a sequence of code signals distributed along the cam track with reference to a parallel sequence of regular intervals marking out the length of the cam track. Driving motion is a lengthwise travel of the cam track regulated by the sequence of interval marking (e. g., by sprocket holes in a tape, etc.). Cam following is indirect, by means of a "pick-up" which "reads" the code sequence in transit and "translates" it into a corresponding mechanical motion.

High capacity/accuracy ratio derives from subdivision of the code-track into the aforementioned regular intervals (as between sprocket holes of a tape, for example). Capacity/accuracy ratio for a single interval may well be comparable to that for a whole ordinary cam. Connecting a chain of such intervals indefinitely end-to-end results in a sum-total capacity/accuracy ratio as large as extension of the code-track may prove convenient.

Numerical data may be encoded in either of two ways, by discrete intermittent steps or continuously.

The intermittent or digital type of code-track cam is represented by several examples. One of these employs a train of patterns of punched holes in teletype tape as the code medium. Others include several methods of pulse-code representation on the sound track of motion picture film. Similar methods, employing "erasable" magnetic tape or wire, have found application in "memory" devices of modern electronic digital computers.

As technical background for this invention, the digital type of code-track cam has culminated in a variety known as a mechanical counting tape. Essentially, it is a form of intermittent gearing. The driving member of this intermittent gear pair is a sprocket-driven toothed tape in which gear teeth are cut at non-uniform intervals along its length. In positive engagement with the tape is the star-wheel mechanism of a conventional gear-counter. Cam follower motion consists of intermittent rotation of the star-wheel in accordance with the law by which teeth are distributed along the counting tape.

Continuous code-track cams have employed a variety of sound-recording media to record a driving signal upon, for example, phonograph discs, magnetic tape or wire, sound motion picture film, etc. As immediate background for this invention, the most important example of a cam of this type is one which consists, essentially, of a three-channel, wavelength-modulated sound track on film which modulates, in turn, three channels of sixty-cycle single-phase alternating current to fed three stator leads to a synchro (self-synchronous) motor or a servo-balanced synchro control transformer. In this system, the synchro unit follows the motion of the film sprocket according to the law of wavelength modulation.

In general, all code-track cams provide a more or less satisfactorily high capacity/accuracy ratio. However, special provision is usually required to ensure either continuity of action (by smoothing devices), positive constraint to maintain correct synchronism in the coupling between cam and cam follower, or both. Specifically, the mechanical counting tape meets well requirements for capacity/accuracy ratio and positive constraint in cam coupling but requires special instrumentation for smoothing its intermittent action. On the other hand, the film-driven synchro cam has good capacity/accuracy ratio and smooth continuity but requires special care to synchronize and maintain the cam coupling with sufficiently positive constraint.

The functional properties of the film-driven synchro cam indicate the fundamental principles upon which this invention is based, namely, the composition of a rotating vector from a corresponding polyphase set of uniformly traveling waves and control of the rate of rotation of said vector by wavelength modulation of the polyphase wave set in conformity with such mathematical law of transmitted motion as may be prescribed.

One principal object of this invention is to provide a wholly mechanical composite cam and cam follower mechanism wherein relative displacement of a composite cam track past a cam follower mechanism engaged in transit with said track causes a corresponding rotary displacement of an element of said follower mechanism in conformity with such mathematical law of transmitted motion as the combined mechanism may be arbitrarily designed to reproduce.

Another principal object of the invention is to provide a composite cam and cam follower mechanism wherein the composite cam incorporates a mechanical embodiment of a wavelength-modulated polyphase set of waves and wherein the cam follower mechanism incorporates at least one rotating mechanical element corresponding to the resultant vector determined by the vector composition of said polyphase set of waves.

A still further object of the invention is to provide a cam and cam follower mechanism capable of high capacity/accuracy ratio.

A still further object of the invention is to provide a cam and cam follower mechanism for smoothly continuous transmission of motion from cam drive to cam follower.

A still further object of the invention is to provide a cam and cam follower mechanism wherein the cam follower is coupled to the cam by positive mechanical constraint.

Other objects of the invention will be apparent from the specification and the drawings.

In the claims and in the following description of the invention, reference is made to embodiment of a rotating vector in a "mechanical eccentric." Wherever used herein, the term, "mechanical eccentric," signifies the generic class of kinematic element having an eccentric axis substantially parallel to and revolving about a principal axis at a fixed radius of eccentricity and, in combination with auxiliary mechanism, adapted for conversion of rotary motion into one or more component reciprocating motions or vice versa. This definition comprehends any such mechanical structure wherein a rigid radius member terminates at the principal axis and, independently, at the eccentric axis either in a co-axial journal or in a co-axial bearing without regard to the relative dimensions of the radius of eccentricity and the radius of journal or bearing and includes the "crank" as a specific type of "mechanical eccentric." It is further emphasized that the term, "crank," wherever used herein comprehends that both crankshaft and crankpin may be, independently, either live or dead spindles.

Essentially, the composite cam and cam follower mechanism of this invention comprises a plurality of cam-and-cam-follower mechanisms co-operating in parallel by virtue of common driving motion and ultimately common follower motion.

Each component cam embodies in cam contour a transverse wave of constant amplitude adapted for lengthwise travel past a cam follower mechanism engaged in transit with the wave cam contour. The corresponding component follower mechanism comprises 1 a cam follower engaged with the component wave cam contour and adapted to follow the transverse reciprocating wave oscillation of said cam contour, 2) a mechanical eccentric, and 3) mechanical coupling between said follower and said eccentric for transmission and conversion of the reciprocating motion of wave oscillation into rotary motion of the mechanical eccentric in a manner analogous to the drive gear of a reciprocating engine.

In further analogy with the compound drive gear of a multicylinder reciprocating engine, at least two such component cam-and-cam-follower mechanisms are arranged to co-operate in parallel and out of phase with each other so as to eliminate the mechanical disadvantage of "dead-center" and ensure an equable phase-distribution of follower torque. Parallel co-operation is obtained, firstly, by common cam drive whereby the component wave cam contours co-operate as a composite polyphase cam track and, secondly, by compounding the eccentric action in polyphase correspondence with the cam track so as to terminate in a common output member of the combined follower mechanism.

Thus, mechanical eccentric rotation follows the longitudinal displacement of the composite cam track through one turn per cycle of polyphase wave travel according to the number of wave cycles per unit length of cam track or, inversely, according to the law of wavelength modulation whereby the composite cam and cam follower mechanism may be designed to reproduce a prescribed mathematical law of transmitted motion.

Fig. 3, Fig. 4, and Fig. 5 illustrate alternative methods for embodiment of a two-phase pair of waves in mechanical cam contour along the length of a movable tape.

Fig. 6 illustrates embodiment of a two-phase pair of waves in mechanical cam contour locally modifying the surface of a movable disc, including supporting means and guiding means whereby the two-phase train of wave oscillations of said cam contour is constrained to travel lengthwise of said train past a cam follower mechanism.

Fig. 6a illustrates one method whereby two discs such as depicted in Fig. 6 may be arranged to co-operate as a composite cam or cam gang.

Fig. 7 illustrates embodiment of a two-phase pair of waves in mechanical cam contour locally modifying the surface of a movable cylinder, including supporting means and guiding means whereby the two-phase train of wave oscillations of said cam contour is constrained to travel lengthwise of said train past a cam follower mechanism.

Fig. 7a illustrates one method whereby two cylinders such as depicted in Fig. 7 may be arranged to co-operate as a composite cam or cam gang.

Figure 8B:
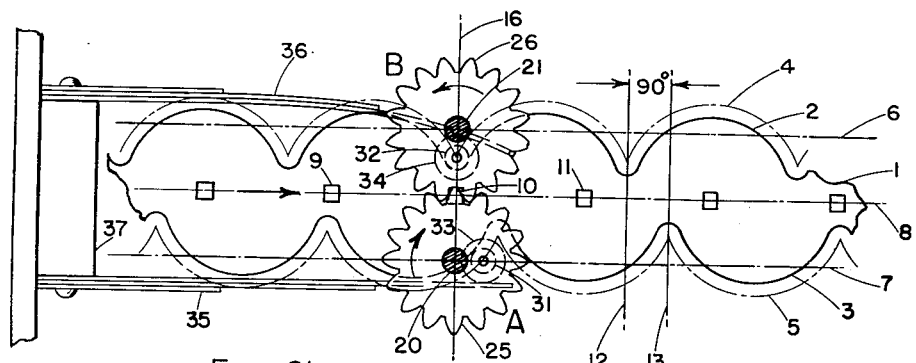
Figures 8, 8A:
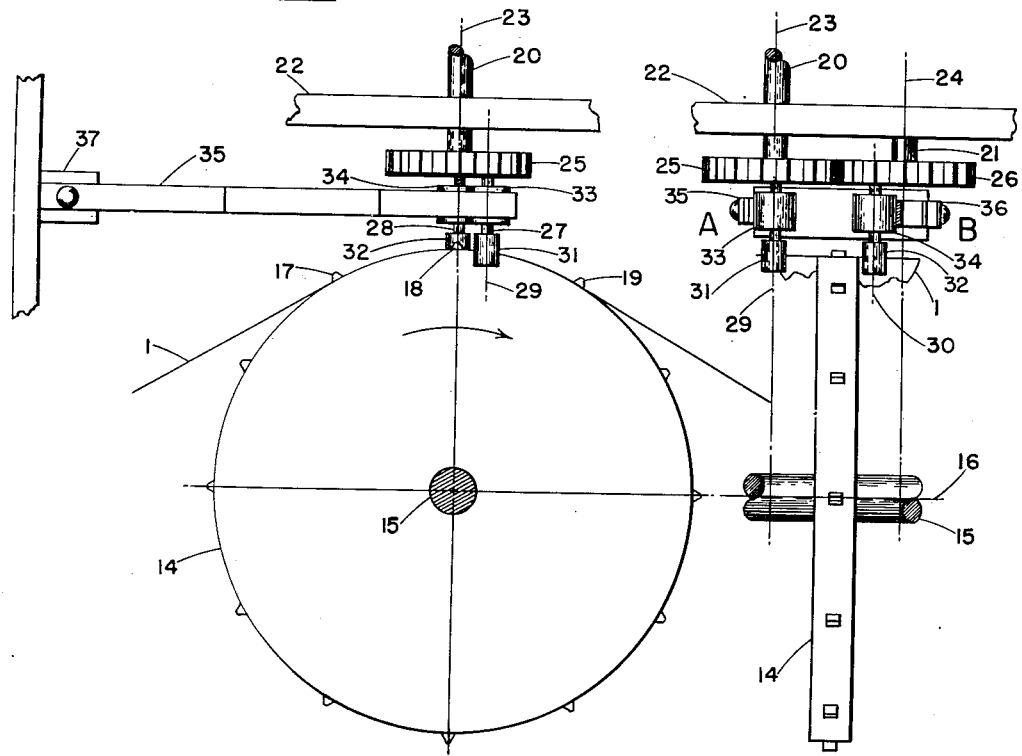

Fig. 8 is a side elevation of a preferred embodiment of the invention wherein a two-phase pair of trochoidal waves is embodied in cam profile along the edges of a sprocket-driven tape which, in turn, drives a two-phase pair of cranks engaged with the tape by mechanical cam follower.

Fig. 8a is an end view of the mechanism of Fig. 8 with the tape partially cut and broken away for purposes of clarity.

Fig. 8b is a plan view of the mechanism of Fig. 8 with the crank support removed to reveal details of the tape and cam follower mechanism.

Fig. 9 is a side elevation of the essential features of another preferred embodiment of the invention wherein a four-phase set of trochoidal waves is embodied in cam profile along the four edges of two sprocket-driven tapes which, in turn, drive a four-phase set of four cranks engaged with the tapes by mechanical cam follower.

Fig. 9a is an end view of the essential features of the mechanism of Fig. 9 with the tapes partially cut and broken away for purposes of clarity.

Fig. 9b is a composite plan view of the mechanism of Fig. 9 with the sprockets removed and with the tapes and their individually associated elements of the follower mechanism displaced laterally apart in order better to portray their functional relationships.

Figure 2:
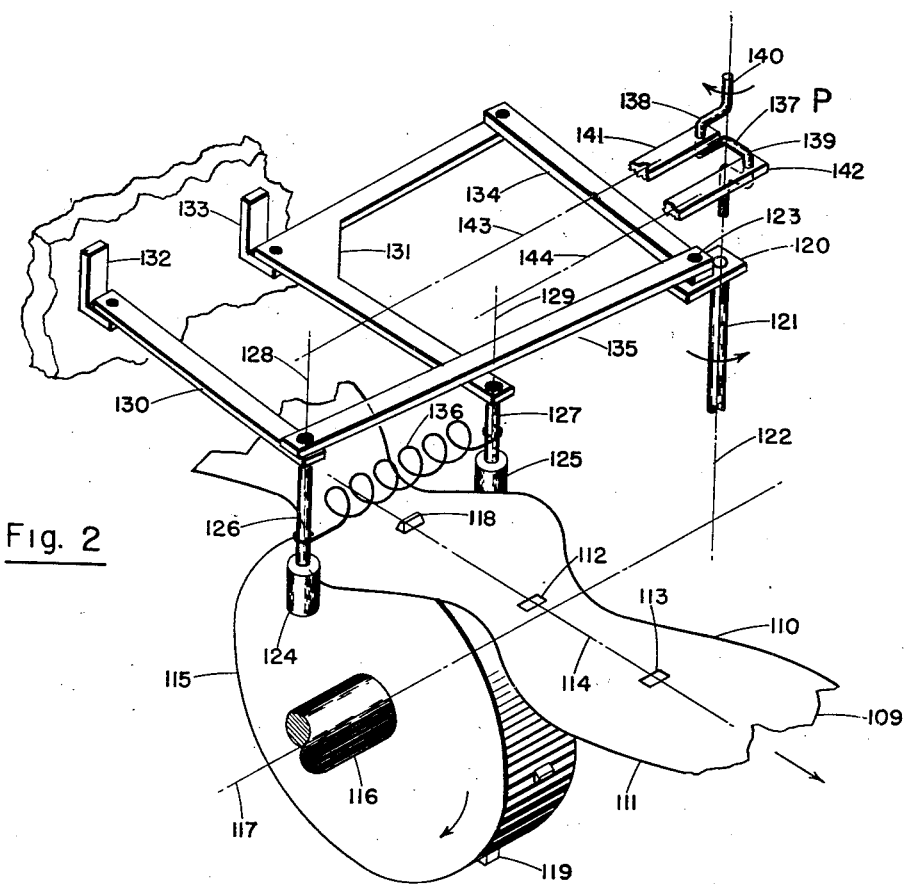
Fig. 2 is an embodiment of the invention serving to illustrate the general application of the principles of Fig. 1 and includes an appended view of an alternative modification of a portion of the mechanism.
Figure 1:
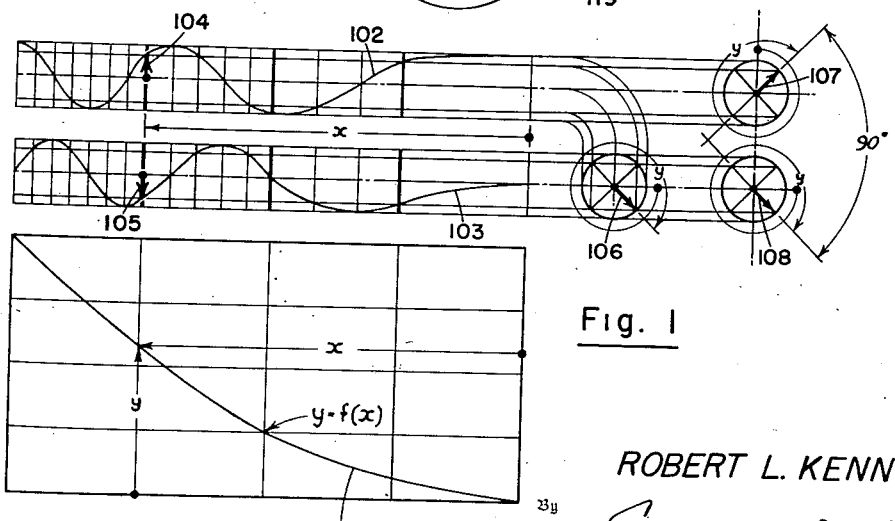
Fig. 1 is a graphical demonstration of the fundamental theoretical principles of the invention and is introduced for explanatory reference.

For purposes of explication, the various parts and the numerals employed to refer to such parts are listed below:

In Fig. 8, Fig. 8a, and Fig. 8b—
1, Tape
2, 3, Cam profiles
4, 5, Cam pitchlines
6, 7, Pitchline centerlines
8, Tape centerline
9, 10, 11, Sprocket holes
12, 13, Phase reference lines
14, Drive sprocket
15, Sprocket shaft
16, Sprocket axis
17, 18, 19, Sprocket teeth
20, 21, Crankshafts
22, Crankshaft support
23, 24, Crankshaft axes
25, 26, Crank gears
27, 28, Crankpins
29, 30, Crankpin axes
31, 32, Cam follower rollers
33, 34, Spring rollers
35, 36, Cam follower springs
37, Spring bracket In Fig. 9, Fig. 9a, and Fig. 9b—
40, 41, Tapes
42, 43, 44, 45, Cam profiles
46, 47, 48, 49, Cam pitchlines
50, 51, 52, 53 Pitchline centerlines
54, 55, Tape centerlines
56, 57, 58, 59, Sprocket holes
60, 61, Phase reference lines
62, 63, Drive sprockets
64, Sprocket axis (plan projection)
65, 66, Sprocket gears
67, 68, 69, 70, 71, Sprocket teeth
72, 73, Crankshafts
74, 75, Crankshaft axes
76, 77, 78 79, Crank gears
80, 81, 82, 83, Crankpins
84, 85, 86, 87, Crankpin axes
88, 89, 90, 91, Cam follower rollers
92, 93, Coupling gears
94, Coupling gear shaft
95, 96, Spiral gears
97, Output shaft In Fig. 1—
101, Curve of mathematical function
102, 103, Component waves of two-phase wave set
104, 105, Component vectors
106, 107, 108, Rotating vectors In Fig. 2—
109, Tape
110, 111, Cam profiles
112, 113, Sprocket holes
114, Tape centerline
115, Drive sprocket
116, Sprocket shaft
117, Sprocket axis
118, 119, Sprocket teeth
120, Crank
121, Crankshaft
122, Crankshaft axis
123, Crankpin
124, 125, Cam follower rollers
126, 127, Cam follower spindles
128, 129, Spindle axes
130, Cantilever rocker
131, Cantilever elbow-rocker
132, 133, Rocker brackets
134, 135, Connecting-rods
136, Cam follower spring
137, Compound crank
138, Crank, primary
139, Crank, secondary 140, Crankshaft
141, 142, Connecting-rods, broken
143, 144, Connecting-rod centerlines
In Fig. 3—
145, Tape
146, 147, Cam contours
148, Drive sprocket
149, 150, Cam follower rollers
In Fig. 4—
151, Tape
152, 153, Cam grooves
154, Cam follower roller
In Fig. 5—
155, Tape
156, 157, Cam grooves
158, Cam follower stylus
In Fig. 6—
159, Disc
160, 161, Cam grooves
162, 163, Cam wave centerlines
164, Disc shaft
165, Disc drive gear
166, Carriage
167, Guide rod
168, Threaded drive and guide rod
169, Fine thread
170, Coarse worm-thread
171, Frame
172, Phantom cam follower mechanism
173, Center of cam follower station
In Fig. 6a—
174, 175, Discs
176, Common shaft
177, Phantom cam follower mechanism
178, Axis of cam follower station
In Fig. 7—
179, Cylinder
180, 181, Cam contours
182, Cylinder shaft
183, Cylinder axis
184, Cylinder lead-screw
185, Mounting yoke
186, Phantom cam follower mechanism
187, Axis of cam follower station
In Fig. 7a—
188, 189, Cylinders
190, 191, Cam contours (in schematic)
192, 193, Cylinder shafts
194, 195, Cylinder lead-screws
196, Mounting yoke
197, 198, Cylinder gears
199, Drive pinion
200, Drive shaft
201, Phantom cam follower mechanism
202, Axis of cam follower station Referring to the drawings, the curve 101 in Fig. 1 represents a general function $y=f(x)$ in conventional rectangular co-ordinates with the exception that the co-ordinate $x$ increases to the left [i. e., oppositely to the corresponding motion of a cam embodiment of $y=f(x)$]. Let it be required that the invention embody this function as its mathematical law of transmitted motion. Driving motion of the composite cam will correspond to displacement in the co-ordinate $x$. Follower motion will correspond to displacement in the co-ordinate $y$.

Now, the function $y=f(x)$ may be represented equally well by the pair of wave curves 102 and 103. For these curves, the horizontal co-ordinate $x$ is identical with that for the curve 101. Vertical co-ordinates for curves 102 and 103 are the horizontal and vertical components, respectively, of a vector 106 of constant length which rotates through an angle $y$ proportional to the vertical co-ordinate $y$ of curve 101. Rotation of vector 106 through two full turns corresponds to the full span of $y$-displacement of curve 101.

Curves 102 and 103 are obtained from curve 101 and vector 106 by means of the following construction. Let the full span of $y$-displacement (rectilinear for curve 101, angular for vector 106) be subdivided into sixteen equal intervals. Corresponding to the uniform intervals in $y$, there are non-uniform intervals in $x$ determined from curve 101, projected vertically upward, and marked out along curves 102 and 103 by vertical projection lines. At the end of successive intervals in $x$, vector 106 occupies successive angular positions spaced 45° apart in $y$. From the eight points occupied successively by the tip of the arrowhead of vector 106, lines are projected horizontally across curve 103. Horizontal lines across curve 102 are obtained similarly from vertical projection of the eight angular positions of vector 106. Then, curves 102 and 103 are drawn through the intersections of corresponding orthogonal projection lines.

Inversely, it can be seen from the diagram that curves 102 and 103 are sufficient to determine vector 106 for all values of $x$. For example, by following curves 102 and 103 as $x$ increases from right to left to the specific value indicated in the diagram, one arrives at component vectors 104 and 105 after one and one-eighth wave cycles. Projecting these vectors backward along the construction lines and adding them vectorially yields the resultant 106 in its position after one and one-eighth turns in $y$.

Thus, the function $y=f(x)$ is represented by the wavelength-modulated two-phase quadrature pair of sinusoidal waves 102 and 103 in terms of the number of wave cycles included in the double-wave train between a point $x$ and the $x$-co-ordinate origin. In order that the invention incorporate $y=f(x)$ in a cam and cam follower mechanism, it only remains to embody a polyphase set of waves such as 102 and 103 in a composite cam, to embody a vector such as 106 in a mechanical eccentric, and to couple each vector component of eccentric motion by mechanical cam follower with corresponding component waves of the composite cam. An example of how this may be done is illustrated in Fig. 2.

A tape 109 of indefinite length embodies along its opposite edges and in phase-quadrature a two-phase pair of waves comparable to waves 102 and 103 by means of cam profiles 110 and 111. Sprocket holes 112, 113, etc. are provided along the tape centerline 114. A drive sprocket 115 is mounted on a fixed axis 117 and provided with sprocket teeth 118, 119, etc. to engage the sprocket holes of tape 109.

For graphic simplicity, Fig. 2 shows tape 109 stretched out flat in a horizontal plane as though it were a rigid rack transported lengthwise along centerline 114 by engagement with drive sprocket 115. In actual practice, it is intended that tape 109 have sufficient longitudinal and lateral rigidity to preserve the waveform and phase relationship of cam profiles 110 and 111 with respect to the centerline and sprocket holes of tape 109 but have sufficient flexibility to wrap in arcuate contact with the upper portion of drive sprocket 115 so as to engage at all times at least two sprocket teeth of said drive sprocket. In addition, it is intended that tape 109 be held in contact with sprocket 115 by tension or by bending stress in the tape or by a combination thereof. Advantage is to be taken of the cylindrical curvature of tape 109 in the region of arcuate contact with sprocket 115 to impart extra rigidity to the edges of said tape which overhang the sides of said sprocket sufficiently to clear cam profiles 110 and 111. In this way, the combination of tape and drive sprocket operates as a composite rotary cam with a length of cam track many times greater than the circumference of the drive sprocket.

Driving motion is imparted through shaft 116 to sprocket 115 and thence to tape 109.

To embody a vector comparable to vector 106 of Fig. 1, a crank 120 is mounted on a fixed vertical axis 122 intersecting sprocket axis 117 at right angles.

Cam profile 111 is coupled to crank 120 by means of mechanical linkage comprising a cam follower roller 124 engaged in rolling contact with profile 111 and mounted on a vertical spindle 126 rigidly attached to cantilever rocker 130 which is suspended from a fixed bracket 132 so that roller 124 may swing horizontally crosswise of tape 109 substantially in the plane (not shown) of axes 117 and 122. To complete the linkage coupling, a connecting-rod 135 is pivoted to rocker 130 at the base of spindle 126 and to crank 120 at crankpin 123.

Cam profile 110 is coupled to crank 120 by more-or-less similar mechanical linkage comprising a cam follower roller 125 engaged in rolling contact with profile 110 and mounted on a vertical spindle 127 rigidly attached to a cantilever elbow-rocker 131 which is suspended at its vertex from a fixed bracket 133 so that roller 125 may swing horizontally crosswise of tape 109 substantially in the plane of axes 117 and 122. The linkage is completed by connecting-rod 134 pivoted to the lateral arm of elbow-rocker 131 at its outboard end and to crank 120 at crankpin 123.

A tension spring 136 is attached to spindles 126 and 127 so as to maintain rolling contact between rollers 124 and 125 and cam profiles 111 and 110, respectively.

The respective wave amplitudes of cam profiles 110 and 111 are equal to the radius of eccentricity of crank 120. In addition, the two arms of elbow-rocker 131 are equal and displaced horizontally through a vertex angle of 90°. In conformity with these relations and with the quadrature phase difference between profiles 110 and 111, the vector components of eccentric motion of crank 120 are related to the wave oscillations of cam profiles 110 and 111 as described in the following paragraph. (The vector components of eccentric motion concerned are reciprocation crosswise of and parallel to tape 109.)

As tape 109 moves forward from left to right, cam profile 111 imparts a crosswise reciprocation to rocker 130, which is transmitted by connecting-rod 135 directly to crank 120. At a phase difference of 90°, cam profile 110 likewise imparts a crosswise reciprocation to the cam follower arm of elbow-rocker 131. This is transformed by the elbow-rocker into parallel reciprocation of connecting-rod 134 and thence transmitted to crank 120. At the instant depicted in Fig. 2, cam follower roller 124 lies on a wave peak of profile 111 corresponding to dead center position between connecting-rod 135 and crank 120. Roller 125 lies at the midpoint of a descending portion of the wave of cam profile 110. At this point, spring 136, pulling on spindle 127, causes a thrust to be imparted to crank 120 by connecting rod 134. Immediately prior thereto, cam profile 111, pressing on roller 124, has caused connecting-rod 135 to pull crank 120 into dead center. Immediately thereafter, roller 124 will be following a descending portion of the wave of cam profile 111; so that spring 136, pulling on spindle 126, will cause connecting-rod 135 to thrust crank 120 away from dead center. Thus, cam profiles 110 and 111 co-operate with spring 136 in half-cycle alternation; and the dual system of cam profiles, follower rollers, and connecting linkages co-operates in phase-quadrature to rotate crank 120 smoothly counter-clockwise as viewed from above.

The waves represented by cam profiles 110 and 111 are modulated in wavelength in a manner comparable to that for waves 102 and 103 of Fig. 1. As tape 109 moves forward to the right, waves of ever-shortening wavelength actuate the cam follower mechanism so as to drive crank 120 at accelerating speed. Any arbitrary law of transmitted motion might be incorporated in tape 109 by means of such wavelength modulation. Thus, a load attached to crankshaft 121 may be driven from shaft 116 in conformity with such mathematical function as the combined mechanism may be required to reproduce.

In the mechanism of Fig. 2, the dimensions of the connecting linkwork are large compared to the wave amplitudes of tape 109 and the radius of eccentricity of crank 120. Consequently, the waveform represented by cam profiles 110 or 111 is very nearly sinusoidal, as for waves 102 and 103 of Fig. 1. However, the invention is by no means restricted to sinusoidal waveform nor even approximately thereto. It is only necessary that the cam follower mechanism possess a geometry of motion mutually conforming with the waveform embodied in tape 109. Inversely speaking, whatever the structure of the cam follower mechanism, the waveform must be such as would be swept out or generated by rollers 124 and 125 if tape 109 and crank 120 were simultaneously and independently actuated in conformity with the prescribed mathematical law of transmitted motion.

By the same argument, the invention is not restricted to equality between the radius of eccentricity of crank 120 and the amplitudes of wave oscillation of cam profiles 110 and 111. For example, the lever arms of elbow-rocker 131 need not be in one-to-one ratio, nor need connecting-rod 135 be pivoted to rocker 130 at spindle 126, provided only that the wave-generating principle of mutual conformity be met.

Moreover, the invention is not restricted to a two-phase system in phase-quadrature. It is, of course, necessary that the phase difference or differences be such as to eliminate the mechanical disadvantage of dead center and ensure an equable phase-distribution of driving torque in the vector composition of reciprocating motions. The principle and scope of the invention are understood to include the generality of polyphase cam and cam follower mechanisms of which the mechanism of Fig. 2 is but one illustrative example.

At P in Fig. 2 is appended a view of a modification of a portion of the follower mechanism which facilitates its mechanical structure. Replacing the single crank 120 is a compound crank 137 comprising a crankshaft 140 mounted on the fixed axis 122, a primary crank 138 and a secondary crank 139 displaced in phase 90° with respect to each other.

The primary crank 138 may be considered to embody a rotating vector (not shown) comparable to vector 106 of Fig. 1. Referring momentarily to Fig. 1, the wave curves 102 and 103 may be obtained alternatively by horizontal projection from a pair of vectors 107 and 108 rotating in unison at a phase difference of 90° as shown. Within said pair, vector 108 corresponds identically to the alternative single vector 106. Returning to Fig. 2, primary crank 138 corresponds identically to the alternative single crank 120 in a similar sense. Likewise, secondary crank 139 is related to primary crank 138 as vector 107 is related to vector 108 in Fig. 1. Moreover, cranks 138 and 139 have radii of eccentricity equal to that of crank 120. Consequently, for crank 139, the vector component of eccentric motion crosswise of tape 109 is identical with the parallel vector component of eccentric motion of crank 120 in all respects save in spatial location and phase orientation.

Advantage is taken of this spatial location and phase orientation to couple crank 139 to rocker 131 directly at the axis 129 of spindle 127 by means of connecting-rod 142. For purposes of clarity, connecting-rod 142 is shown broken; so that the coupling is indicated schematically by extension of the centerline 144 of connecting-rod 142 to its intersection with spindle axis 129. Similarly, crank 138 is coupled directly to rocker 130 by the "broken" connecting-rod 141 extended schematically in its centerline 143 to its intersection with spindle axis 128.

With the modified follower mechanism, motion of tape 109 forward and to the right produces clockwise rotation of compound crank 137 as viewed from above. In all other respects, operation of the modified mechanism is identical with operation of the original mechanism of Fig. 2.

Embodiment of a polyphase set of waves in a composite cam is by no means restricted to embodiment in cam profile on the edges of a movable tape. Fig. 3 illustrates embodiment of a two-phase pair of waves in a tape 145 driven by a sprocket 148 in a manner similar to the sprocket drive of Fig. 2. In this case, the waves are embodied in cam contours 146 and 147 as the result of a process whereby the tape is first slit intermittently along parallel lines near the edges of the tape and then crimped along the edges into a pair of flat, narrow, wavy ribbons the wave oscillations of which are disposed perpendicular to the otherwise substantially flat surface of the tape. Cam follower rollers 149 and 150 are engaged in rolling contact with cam contours 146 and 147, respectively, and are adapted by means not shown to follow the wave oscillations of said cam contours in a direction substantially radial with respect to the axis of drive sprocket 148.

In Fig. 4, a two-phase pair of waves is embodied in a pair of cam grooves 152 and 153 in a tape 151 of sufficient thickness to receive such grooves. Cam grooves 152 and 153 have straight vertical sides and are of such width as to mate snugly with cylindrical cam follower rollers such as the sample roller 154 shown poised vertically above cam groove 152, which it is intended to engage.

In Fig. 5, a similar tape 155 is provided with semicircular wave cam grooves 156 and 157 adapted to engage cam followers such as the ballpoint stylus 158 shown poised vertically above its mating cam groove 156.

Many varieties of cam structure, both simple and compound, may be employed to incorporate a polyphase set of waves within the intent and scope of this invention. Fig. 6 illustrates an alternative embodiment of a two-phase wave pair in spiral convolutions on the surface of a disc 159.

Cam grooves 160 and 161 are drawn in full over a portion of their length and indicated schematically by spiral wave centerlines 162 and 163, respectively, for the remainder of their length. For purposes of illustration, the dimensions of both grooves and spiral course are exaggerated. In actual practice, it is intended that many thin spiral convolutions may be packed closely together approaching more nearly the surface configuration of a grooved phonograph disc.

Disc 159 is mounted on shaft 164 supported by bearings (not shown) in sliding carriage 166. Carriage 166 is both supported and guided by rods 167 and 168 mounted in frame 171. Guide rod 168 also serves as a drive shaft and incorporates a fine thread 169 mating with a female thread (not shown) in carriage 166 so as to transport carriage 166 longitudinally after the manner of a lead screw. Drive shaft and guide rod 168 also incorporates a coarse thread 170 serving as a worm to drive worm-gear 165 integrally joined to the underside of disc 159.

The combined lead of threads 169 and 170 is calculated to match the spiral lead of cam grooves 160 and 161, so that the two-phase train of wave oscillations of said cam grooves is constrained to travel lengthwise of said train past the station center 173 at which a cam follower mechanism engages said grooves in transit. Inasmuch as the description at this point is solely concerned with details of cam structure, the corresponding cam follower mechanism is indicated schematically in phantom outline 172 as a structure supported by frame 171 and extending over the surface of disc 159.

Fig. 6a illustrates one method whereby two discs 174 and 175 comparable to disc 159 of Fig. 6 may be mounted together on common shaft 176 with their respective cam grooves (not shown) inwardly facing each other so as to co-operate as a composite cam or cam gang. Again, the corresponding cam follower mechanism is shown in phantom outline 177. Axis 178 indicates the station at which the cam follower mechanism engages the cam grooves of discs 174 and 175, the composite train of wave oscillations of said cam grooves being constrained to travel lengthwise of said train past station axis 178.

In Fig. 7, a two-phase pair of wave cam contours 180 and 181 is embodied in spiral convolutions on the surface of a cylinder 179. As in Fig. 6, the dimensions of the cam contours as well as their spiral lead are exaggerated for clarity in illustration.

Cylinder 179 is mounted on a fixed axis 183 by means of a co-axial shaft 182 supported by stationary yoke 185. A lead screw 184 at one end of shaft 182 mates with a female thread in a corresponding end of yoke 185. Screw 184 has a lead identical with that of cam contours 180 and 181. Thus, as the cam is driven by rotation of shaft 182, cylinder 179 is transported axially; so that the train of wave oscillations of cam contours 180 and 181 is constrained to travel lengthwise of said train past the station axis 187 of a cam follower mechanism indicated in phantom outline 186 as rigidly attached to yoke 185.

Fig. 7a illustrates one method whereby a pair of cylinders 188 and 189 comparable to cylinder 179 of Fig. 7 may be combined to co-operate as a composite cam or cam gang.

Parallel shafts 192 and 193, including lead screws 194 and 195, support and drive cylinders 188 and 189, respectively, and are, in turn, supported by mounting yoke 196. Cylinders 188 and 189 are driven in unison by gears 197 and 198 mounted on shafts 192 and 193, respectively, and in mesh with a common drive pinion 199 mounted on drive shaft 200. The corresponding cam follower mechanism is rigidly attached to yoke 196 as shown in phantom outline 201.

In operation, cam contours 190 and 191 (indicated schematically) on cylinders 188 and 189, respectively, are transported so that the composite train of wave oscillations embodied therein travels lengthwise of said train past the axis 202 of the cam follower station.

Fig. 6 and Fig. 7 present examples of but two axially symmetrical forms of cam body. The invention comprehends, generally, any axially symmetrical cam body wherein cam contours are borne in spiral convolutions about the axis and locally modifying the surface of revolution of the cam body. Where driving motion is a uniform rotation of the cam body about its axis, linear travel of the train of wave oscillations of such spiral cam contours will vary substantially proportionally to the radius from the axis to the point of engagement of said cam contours by the cam follower mechanism. Consequently, such cams as incorporate a train of wave oscillations in a helix of varying radius will partake of some of the characteristics of the type of helical polar cam wherein follower motion is produced by various metering mechanism as an integrated distance measured along the helical cam contour. This is to say that the law of wavelength modulation with reference to a longitudinal co-ordinate along the spiral cam track will be a considerable modification of the prescribed mathematical law of transmitted motion as expressed with reference to the angular co-ordinate of cam rotation by virtue of the shape of the cam helix. Such combination of the principles of this invention with the features of other types of cam is understood to represent application of said principles by no means in conflict with nor prejudicial to the intent and scope of the invention.

It is to be noted that the invention is not restricted to incorporation of a polyphase set of waves within a single cam body. Fig. 6a and Fig. 7a (as well as Fig. 9, Fig. 9a, and Fig. 9b described below) portray examples of incorporation of a polyphase set of waves in a composite cam wherein the component waves of said polyphase wave set are distributed arbitrarily among and borne in mechanical cam contour by a plurality of movable mechanical elements provided with supporting means, guiding means, and common driving means whereby the totality of component wave cam contours co-operates in polyphase unison as a composite multi-curve cam track in a cam gang.

Furthermore, the invention comprehends orientation of the direction of transverse wave oscillation at any arbitary angle with respect to the surface of a movable mechanical element wherein such oscillations are embodied in mechanical cam contour. In Fig. 2, Fig. 4, Fig. 5, Fig. 6, Fig. 8, and Fig. 9, the transverse wave oscillations of the incorporated cam contours are disposed parallel to the surface of a movable mechanical element. In Fig. 3 and Fig. 7, the wave oscillations are disposed at an angle to the surface of a movable mechanical element, for example, at a right angle.

It has been mentioned that the invention is not limited to cam contours of sinusoidal or nearly sinusoidal waveform. The composite cams and cam follower mechanisms of Fig. 8 and Fig. 9 illustrate preferred embodiments of the invention wherein the waveform is trochoidal.

In Fig. 8, Fig. 8a, and Fig. 8b, a two-phase quadrature pair of trochoidal waves is incorporated in cam profile along the two edges of a movable tape 1. Cam profiles 2 and 3 are generated from cam pitchlines 4 and 5, respectively, and are separated therefrom by equidistant clearance to accommodate cam followers of circular cross section. Pitchlines 4 and 5 are trochoidal waves, in this case verging upon the limiting form of the cycloid with cusps pointed inward with respect to tape 1. Wave centerlines 6 and 7 for pitchlines 4 and 5, respectively, lie parallel to the tape centerline 8.

By convention, the positive direction of the wave ordinates for pitchlines 4 and 5 is considered inward toward centerline 8 of tape 1. Pitchlines 4 and 5 are aligned longitudinally at 90° phase difference with respect to each other and with reference to any normal cross section of tape 1 such as phase reference lines 12 and 13. By the aforementioned convention, pitchline 4 lags pitchline 5 for travel of the tape from left to right.

Tape 1 is provided with sprocket holes 9, 10, 11, etc., along the centerline 8. A drive sprocket 14 is mounted on a fixed axis 16 and provided with sprocket teeth 17, 18, 19, etc., to engage sprocket holes 9, 10, 11, etc., of tape 1. By virtue of tension, bending stress, or by a combination thereof in tape 1, tape 1 is supported and guided in transport in arcuate contact with the upper portion of drive sprocket 14 with edges of tape 1 overhanging the sides of sprocket 14 sufficiently to clear cam profiles 2 and 3. Tape 1 is further guided by simultaneous engagement of at least two adjacent sprocket holes 9, 10, 11, etc., with sprocket teeth 17, 18, 19, etc., of sprocket 14. Driving motion is imparted through drive shaft 15 to sprocket 14 and thence to tape 1. Thus, tape 1 and sprocket 14 co-operate as a double-curve rotary cam with a length of cam track many times greater than the circumference of sprocket 14.

At A and B in Fig. 8a and Fig. 8b are located two cranks designated hereinafter as crank A and crank B. Crank A comprises a crankshaft 20, a combination crankwheel and gear 25, and a crankpin 27, and has a radius of eccentricity equal to the wave amplitude of cam profile 3. Crank B comprises a crankshaft 21, a combination crankwheel and gear 26, and a crankpin 28, and has a radius of eccentricity equal to the wave amplitude of cam profile 2. Crankshaft 20 is mounted in bearings (not shown) in a fixed supporting plate 22 so that crankshaft axis 23 lies perpendicular to both pitchline centerline 7 and sprocket axis 16 and, hence, perpendicular to the direction of wave oscillation of profile 3 of tape 1 in the region of arcuate contact of tape 1 with sprocket 14. Similarly, crankshaft 21 is supported from bearing plate 22 with its crankshaft axis 24 parallel to crankshaft axis 23 and perpendicular to pitchline centerline 6 and sprocket axis 16 and, hence, perpendicular to the direction of wave oscillation of profile 2 of tape 1 in said region of arcuate contact with sprocket 14. Crank B is coupled to crank A by gears 25 and 26 so as to rotate in unison with crank A but at a phase lag of 90° in correspondence with the phase relation between cam profiles 2 and 3.

Crankpin 27 overhangs the edge of tape 1 and carries near its extremity a cam follower roller 31 of radius equal to the equidistant clearance between pitchline 5 and profile 3 and of such axial disposition and length as to engage in constant tangent contact with profile 3, whereby crankpin axis 29 is constrained to intersect and follow pitchline 5. A second roller 33 is mounted on crankpin 27; and a leaf spring 35, mounted on a fixed bracket 37, is adapted to apply pressure to roller 33 so as to maintain rolling contact between cam follower roller 31 and cam profile 3.

Similarly, crankpin 28 overhangs the edge of tape 1 and carries near its extremity a cam follower roller 32 of radius equal to the equidistant clearance between pitchline 4 and profile 2 and of such axial disposition and length as to engage in constant tangent contact with profile 2, whereby crankin axis 30 is constrained to intersect and follow pitchline 4. A second roller 34 is mounted on crankpin 28; and a leaf spring 36, mounted on a fixed bracket 37, is adapted to apply pressure to roller 34 so as to maintain rolling contact between cam follower roller 32 and cam profile 2.

Thus, the two-phase cam coupling between follower cranks A and B and cam profiles 3 and 2, respectively, co-operates with the mutual crank gearing at quadrature phase difference so as to eliminate the mechanical disadvantage of dead center and ensure an equable phase-distribution of driving torque. Thereby, cranks A and B are constrained to rotate smoothly through one turn per cycle of two-phase wave travel of the composite cam track of tape 1 according to the number of wave cycles or wavelengths per unit length of cam track in conformity with such mathematical law of transmitted motion as the combined mechanism may be arbitrarily required to reproduce.

It is understood that employment of a 90° phase difference in the two-phase system of Fig. 8 is a matter of preference and that any phase interval would be satisfactory which eliminates the mechanical disadvantage of dead center and provides reasonably smooth driving torque.

It is noteworthy that the mechanism of Fig. 8 provides cam coupling with positive constraint only up to the limit of constraining torque supplied by pressure from springs 35 and 36. For example, an output load assumed to be driven by crankshaft 20 must not be so heavy as to exceed the limit of constraining torque maintained by springs 35 and 36.

Fig. 9, Fig. 9a, and Fig. 9b illustrate a preferred embodiment of the invention in a four-phase composite cam and cam follower mechanism wherein the cam coupling is positively constrained without the necessity for follower springs. A four-phase set of waves in phase-quadrature with respect to each other is embodied in cam profile along the four edges of a pair of tapes 40 and 41.

Tapes 40 and 41 are shown in Fig. 9b in plan projection and displaced laterally apart along centerline 64 so as to portray their details in correct phase relationship. (Centerline 64 is the plan projection of both axes, otherwise not shown, of drive sprockets 62 and 63.) Cam profiles 42, 43, 44, and 45 are generated from trochoidal wave pitchlines 46, 47, 48, and 49, respectively, and separated therefrom by equidistant clearance to accommodate cam followers of circular cross section. Pitchline centerlines 50 and 51 are parallel to tape centerline 54; and, likewise, for pitchline centerlines 52 and 53 with respect to tape centerline 55. The tapes are provided, along their centerlines, with sprocket holes 55, 57, 58, 59, etc.

A pair of drive sprockets 62 and 63 are mounted on fixed, parallel axes (not shown in Fig. 9 or Fig. 9a) and are coupled together so as to rotate in unison by means of gears 65 and 66 integrally attached to sprockets 62 and 63, respectively. Drive sprocket 62 is provided with teeth 67, 68, 69, etc., to engage sprocket holes 56, 57, 58, etc., of tape 40. Drive sprocket 63 is provided with teeth 70, 71, etc., to engage sprocket holes 59, etc., of tape 41. In all respects, tapes 40 and 41 are supported and transported by sprockets 62 and 63, respectively, in the manner described for tape 1 and sprocket 14 of the mechanism of Fig. 8. Thus, tapes 40 and 41 co-operate with sprockets 62 and 63 as a four-phase composite cam with a quadruple-curve cam track represented by profiles 42, 43, 44, 45.

The corresponding cam follower mechanism comprises, among other elements, a four-phase set of four cranks located at C, D, E and F in Fig. 9a and Fig. 9b. Said cranks will be designated hereinafter as crank C, crank D, crank E, and crank F. Cranks C and E possess a common crankshaft 73. Cranks D and F, likewise, share a common crankshaft 72. Crank C further comprises a combination crankwheel and gear 77 and a crankpin 81. Crank gear 75 and crankpin 80 serve to complete crank D. Similarly, cranks E and F are further composed of gear 79 and crankpin 83 and of gear 78 and crankpin 82, respectively. Each crank C, D, E, or F has a radius of eccentricity equal to the wave amplitude of its corresponding cam profile 43, 42, 45, or 44. Crankshafts 72 and 73 are mounted on fixed parallel axes 75 and 74, respectively. Axis 75 extends perpendicularly through pitchline centerlines 50 and 52 and perpendicularly to the direction of wave oscillation of cam profiles 42 and 44 and, hence, extends further perpendicularly through the axes of drive sprockets 62 and 63. Axis 74 likewise extends perpendicularly through pitchline centerlines 51 and 53, the direction of wave oscillation of cam profiles 43 and 45, and, hence, the axes of drive sprockets 62 and 63. Cranks C, D, E, and F are further coupled together so as to rotate in unison at fixed phase intervals by means of coupling gears 92 and 93 mounted on a common coupling gear shaft 94.

A cam follower roller 88, mounted upon crankpin 80, has a radius equal to the equidistant clearance between pitchline 46 and cam profile 42, overhangs the adjacent edge of tape 40, and is of such axial disposition and length as to engage in constant rolling contact with profile 42; so that crankpin axis 84 is constrained to intersect and follow pitchline 46. A cam follower roller 89, mounted on crankpin 81, is similarly associated with profile 43; so that crankpin axis 85 is constrained to intersect and follow pitchline 47.

By the convention whereby pitchline wave ordinates are considered positive inwardly towards the tape centerline, pitchline waves 46 and 47 are aligned longitudinally at 180° phase difference with respect to each other and with reference to any normal cross section of tape 40 such as phase reference line 61. In conformity with the same convention, cranks C and D rotate in unison at what is thereby considered to be 180° phase difference. When one crank of the C, D pair of cranks is following a descending portion of its corresponding cam profile, the other crank of said pair is following a correspondingly rising portion of its cam profile. Thus, tape 40 is captured between follower rollers 88 and 89; so that crankpin axes 84 and 85 are truly constrained to follow pitchlines 46 and 47, respectively.

Cam pitchlines 48 and 49 are likewise phased at 180° with respect to each other and with reference to any normal cross section of tape 41 such as phase reference line 60; and cranks E and F rotate at a corresponding 180° phase difference. Cranks F and E are equipped with cam follower rollers 90 and 91, respectively, in a manner identical with the previous description for cranks C and D. Thus, tape 41 is captured between rollers 90 and 91; so that crankpin axes 86 and 87 are constrained to intersect and follow pitchlines 48 and 49, respectively.

Tapes 40 and 41, together with their corresponding crank pairs C, D, and E, F, are further displaced in phase by 90° as indicated by phase reference lines 60 and 61. Thus, the totality of cam coupling co-operates in four-phase combination with the mutual coupling between cranks C, D, E, and F at quadrature-phase intervals so as to eliminate the mechanical disadvantage of dead center and ensure an equable phase-distribution of driving torque. Thereby, said cranks are constrained to rotate smoothly through one turn per cycle of four-phase wave travel of the composite cam track of tapes 40 and 41 according to the number of wave cycles or wavelengths per unit length of cam track in conformity with such mathematical law of transmitted motion as the combined mechanism may be arbitrarily designed to reproduce.

Finally, the cam follower mechanism is adapted to drive an output load by means of meshing spiral gears 95 and 96 on shafts 94 and 97, respectively.

It is noteworthy that the positive constraint of cam coupling of the mechanism of Fig. 9 requires that cranks C, D, E, and F and their associated cam profiles be phased by pairs having 180° phase difference. In the drawing, cranks C and D and cranks E and F are so paired. Alternative arrangements would be by pairs of cranks C with E and D with F, or C with F and D with E. Otherwise, the remaining phase interval as between such pairs of cranks need not be 90° as indicated by phase reference lines 60 and 61 but may be at any phase interval which eliminates the mechanical disadvantage of dead center and provides a reasonably smooth driving torque.

Further, a four-phase embodiment of the invention is not restricted to a pair of tapes separately supported and transported by a pair of drive sprockets. Said pair of tapes may be supported and transported equally well over the diametrically opposite portions of a single drive sprocket. Moreover, the associated cam follower cranks may be mounted and coupled together in any manner consistent with the principle and scope of the invention as indicated above and expressed in the appended claims.

The composite cam and cam follower mechanism of this invention manifests the desired properties of high capacity/accuracy ratio, smooth continuity and positive constraint in the cam coupling, thereby recommending it for application independently or as a component of computing instruments employed in systems for control of industrial processes, et al.

It is to be understood that the specific examples illustrated and described herein represent preferred embodiments of the invention, but without implied limitation thereto. I reserve the right to make such changes or modifications as may come within the principle and scope of the appended claims.

I claim:

1. In combination, a composite cam and cam follower mechanism wherein relative displacement of a composite cam track past a cam follower mechanism engaged in transit with said track causes a corresponding rotary displacement of an element of said follower mechanism in conformity with such mathematical law of transmitted motion as the combined mechanism may be arbitrarily designed to reproduce; said composite cam comprising at least one movable mechanical element wherein said cam incorporates a set of cam contours, supporting means and guiding means therefor, and common driving means, wherein said composite cam embodies a polyphase set of continuous transverse waves of arbitrary linear extent and constant but not necessarily identical amplitude, displaced in phase with respect to each other, of appropriate waveform and modulated in wavelength so as to represent corresponding polyphase components of a vector of constant length rotating continuously at a non-uniform rate with respect to the longitudinal co-ordinate of the polyphase wave set in conformity with said mathematical law of transmitted motion, each component wave of said polyphase wave set being borne in mechanical cam contour by a movable mechanical element of said composite cam, said movable mechanical element being provided with said supporting means and guiding means whereby the train of wave oscillations of said cam contour is constrained to travel lengthwise of said train past a cam follower mechanism as further described hereinafter, said composite cam incorporating said polyphase set of waves by means of at least one such movable element connected with said common driving means whereby the totality of component wave cam contours co-operates in polyphase unison as a composite multi-curve cam track, the polyphase train of wave oscillations embodied therein being guided in lengthwise transport past a cam follower mechanism engaged in transit with said composite cam track; said cam follower mechanism comprising a mechanical eccentric rotatably mounted and of constant radius of eccentricity wherein it embodies the aforesaid rotating vector of constant length having polyphase vector components of motion individually represented by corresponding component waves of the polyphase wave set, means to couple said mechanical eccentric with a driven load, and composite means to couple said mechanical eccentric phase-to-phase with the composite cam track, said composite means comprising individual mechanical coupling between each vector component of eccentric motion of said mechanical eccentric and the cam contour of a corresponding component wave of the polyphase wave set in mutual conformity with the waveform and phase of said component wave, said individual mechanical coupling in each case terminating at one end in a mechanical cam follower engaged with said component wave cam contour whereby said mechanical eccentric is constrained to rotate in synchronism with the wave oscillations of said cam contour as engaged in transit with said follower, the totality of said individual mechanical coupling co-operating in polyphase combination at such phase intervals as to eliminate the mechanical disadvantage of any dead center condition and ensure an equable phase-distribution of driving torque whereby said mechanical eccentric is constrained to rotate smoothly with passage of the composite cam track; said composite cam and cam follower mechanism co-operating as a mechanical coupling with varying transmission ratio by producing rotation of said mechanical eccentric through one turn per cycle of polyphase wave travel of the composite cam track past the follower mechanism, the number of polyphase wave cycles or wavelengths per unit length of cam track varying along the cam track in conformity with said mathematical law of transmitted motion.

2. In the combination of composite cam and cam follower mechanism as described in claim 1, incorporation of the polyphase set of waves in said composite cam wherein every component wave of said polyphase wave set is borne in mechanical cam contour by the same movable mechanical element, the totality of component wave cam contours co-operating in polyphase unison as a composite multi-curve cam track within a single cam body.

3. In the combination of composite cam and cam follower mechanism as described in claim 1, incorporation of the polyphase set of waves in said composite cam wherein the component waves of said polyphase wave set are distributed arbitrarily among and borne in mechanical cam contour by a plurality of movable mechanical elements provided with supporting means, guiding means, and common driving means whereby the totality of component wave cam contours co-operates in polyphase unison as a composite multi-curve cam track in a cam gang.

4. In the combination of composite cam and cam follower mechanism as described in claim 1, incorporation in said cam follower mechanism of a plurality of mechanical eccentrics of constant but not necessarily equal radii of eccentricity, so mounted and coupled together mechanically so as to rotate in unison at fixed phase intervals, one mechanical eccentric of said plurality serving as a reference member to embody the rotating vector of constant length, the remainder of said mechanical eccentrics having eccentric motions proportional to and otherwise equivalent to the eccentric motion of said reference member except for individually differing spatial location and phase orientation of said motions whereby advantage is taken of said individual spatial location and phase orientation to facilitate the individual mechanical coupling between each vector component of eccentric motion and the cam contour of the corresponding component wave of the polyphase wave set, said individual mechanical coupling in each case engaging the corresponding vector component of eccentric motion of such particular mechanical eccentric as complies with said facilitating advantage, every mechanical eccentric being so engaged in at least one vector component of eccentric motion, whereby said reference mechanical eccentric is coupled phase-to-phase with the composite cam track in part by direct coupling and in part through intermediate coupling with the remainder of said plurality of mechanical eccentrics.

5. In the combination of composite cam and cam follower mechanism as described in claim 1, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed parallel to said surface.

6. In the combination of composite cam and cam follower mechanism as described in claim 1, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed at an angle with respect to said surface.

7. In the combination of composite cam and cam follower mechanism as described in claim 1, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed perpendicular to said surface.

8. In the combination of composite cam and cam follower mechanism as described in claim 1, incorporation of the polyphase set of waves in said composite cam wherein at least one component wave of said polyphase wave set is embodied in mechanical cam contour along the length of a movable tape, said movable tape being provided with supporting means and guiding means adapted for connection with the common driving means of said composite cam whereby the train of wave oscillations of said cam contour is constrained to travel lengthwise of said train past a cam follower mechanism.

9. In the combination of composite cam and cam follower mechanism as described in claim 1, incorporation of the polyphase set of waves in said composite cam wherein at least one component wave of said polyphase wave set is embodied in mechanical cam contour in spiral convolutions about the axis and locally modifying the surface of revolution of an axially symmetrical movable body, said movable body being provided with supporting means and guiding means adapted for connection with the common driving means of said composite cam whereby the train of wave oscillations of said cam contour is constrained to travel lengthwise of said train past a cam follower mechanism.

10. In the combination of composite cam and cam follower mechanism as described in claim 1, incorporation of the polyphase set of waves in said composite cam wherein at least one component wave of said polyphase wave set is embodied in mechanical cam contour in spiral convolutions about the center and locally modifying the surface of a movable disc, said movable disc being provided with supporting means and guiding means adapted for connection with the common driving means of said composite cam whereby the train of wave oscillations of said cam contour is constrained to travel lengthwise of said train past a cam follower mechanism.

11. In the combination of composite cam and cam follower mechanism as described in claim 1, incorporation of the polyphase set of waves in said composite cam wherein at least one component wave of said polyphase wave set is embodied in mechanical cam contour in spiral convolutions about the axis and locally modifying the cylindrical surface of a movable cylinder, said movable cylinder being provided with supporting means and guiding means adapted for connection with the common driving means of said composite cam whereby the train of wave oscillations of said cam contour is constrained to travel lengthwise of said train past a cam follower mechanism.

12. In combination, a composite cam and cam follower mechanism wherein relative displacement of a composite cam track past a cam follower mechanism engaged in transit with said track causes a corresponding rotary displacement of an element of said follower mechanism in conformity with such mathematical law of transmitted motion as the combined mechanism may be arbitrarily designed to reproduce; said composite cam comprising at least one movable mechanical element wherein said cam incorporates a set of cam contours, supporting means and guiding means therefor, and common driving means, wherein said composite cam embodies a polyphase set of trochoidal waves of arbitrary linear extent and constant but not necessarily identical amplitude, displaced in phase with respect to each other and modulated in wavelength so as to represent the corresponding polyphase components of a vector of constant length rotating continuously at a non-uniform rate with respect to the longitudinal co-ordinate of the polyphase wave set in conformity with said mathematical law of transmitted motion, each component wave of said polyphase wave set being borne in mechanical cam contour by a movable mechanical element of said composite cam, said component wave acting as pitchline for said cam contour with equidistant clearance between said pitchline and said cam contour to accommodate a cam follower of circular cross section, said movable mechanical element being provided with said supporting means and guiding means whereby the train of wave oscillations of said cam contour is constrained to travel lengthwise of said train past a cam follower mechanism as further described hereinafter, said composite cam incorporating said polyphase set of waves by means of at least one such movable element connected with said common driving means whereby the totality of component wave cam contours co-operates in polyphase unison as a composite multi-curve cam track, the polyphase train of wave oscillations embodied therein being guided in lengthwise transport past a cam follower mechanism engaged in transit with said composite cam track; said cam follower mechanism comprising a numerically equivalent polyphase set of mechanical eccentrics individually corresponding to the component waves of said cam track, mounted and adapted for relative motion with respect to said cam track as described hereinafter, and coupled together so as to rotate in unison at fixed phase intervals corresponding to the phase intervals between said component waves, means to couple said set of mechanical eccentrics with a driven load, and composite means to couple said set of mechanical eccentrics phase-to-phase with the composite cam track, said composite means comprising individual coupling between each mechanical eccentric and a corresponding cam contour, including means to maintain said individual coupling, wherein said mechanical eccentric has its principal axis mounted perpendicular to the transverse direction of wave oscillation of the pitchline of said cam contour and perpendicular to the longitudinal centerline of said pitchline, its eccentric axis parallel to said principal axis at a radius of eccentricity equal to the wave amplitude of said pitchline, and mounted coaxially upon said eccentric axis a cam follower with circular cross section of radius equal to the equidistant clearance between said pitchline and said cam contour and in constant tangent contact with said cam contour whereby said eccentric axis is constrained to intersect and follow said pitchline in conformity with the waveform and phase of the corresponding component wave and thereby to rotate said mechanical eccentric in synchronism with the wave oscillations of said cam contour as engaged in transit with said follower, the totality of said individual coupling co-operating in polyphase combination with the mutual coupling internal to said polyphase set of mechanical eccentrics at such phase intervals as to eliminate the mechanical disadvantage of any dead center condition and ensure an equable phase-distribution of driving torque whereby said mechanical eccentrics are constrained to rotate smoothly with passage of the composite cam track; said composite cam and cam follower mechanism co-operating as a mechanical coupling with varying transmission ratio by producing rotation of said mechanical eccentrics through one turn per cycle of polyphase wave travel of the composite cam track past the follower mechanism, the number of polyphase wave cycles or wavelengths per unit length of cam track varying along the cam track in conformity with said mathematical law of transmitted motion.

13. In the combination of composite cam and cam follower mechanism as described in claim 12, incorporation of the polyphase set of waves in said composite cam wherein every component wave of said polyphase wave set is borne in mechanical cam contour by the same movable mechanical element, the totality of component wave cam contours co-operating in polyphase unison as a composite multi-curve cam track within a single cam body.

14. In the combination of composite cam and cam follower mechanism as described in claim 12, incorporation of the polyphase set of waves in said composite cam wherein the component waves of said polyphase wave set are distributed arbitrarily among and borne in mechanical cam contour by a plurality of movable mechanical elements provided with supporting means, guiding means, and common driving means whereby the totality of component wave cam contours co-operates in polyphase unison as a composite multi-curve cam track in a cam gang.

15. In the combination of composite cam and cam follower mechanism as described in claim 12, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed parallel to said surface.

16. In the combination of composite cam and cam follower mechanism as described in claim 12, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed at an angle with respect to said surface.

17. In the combination of composite cam and cam follower mechanism as described in claim 12, incorporation of the polyphase set of waves in said composite cam wherein at least one component wave of said polyphase wave set is embodied in mechanical cam contour locally modifying the surface of a movable mechanical element so that the transverse wave oscillations of said component wave are disposed perpendicular to said surface.

18. In the combination of composite cam and cam follower mechanism as described in claim 12, incorporation of the polyphase set of waves in said composite cam wherein at least one component wave of said polyphase wave set is embodied in mechanical cam contour along the length of a movable tape, said movable tape being provided with supporting means and guiding means adapted for connection with the common driving means of said composite cam whereby the train of wave oscillations of said cam contour is constrained to travel lengthwise of said train past a cam follower mechanism.

19. In the combination of composite cam and cam follower mechanism as described in claim 12, incorporation of the polyphase set of waves in said composite cam wherein at least one component wave of said polyphase wave set is embodied in mechanical cam contour in spiral convolutions about the axis and locally modifying the surface of revolution of an axially symmetrical movable body, said movable body being provided with supporting means and guiding means adapted for connection with the common driving means of said composite cam whereby the train of wave oscillations of said cam contour is constrained to travel lengthwise of said train past a cam follower mechanism.

20. In the combination of composite cam and cam follower mechanism as described in claim 12, incorporation of the polyphase set of waves in said composite cam wherein at least one component wave of said polyphase wave set is embodied in mechanical cam contour in spiral convolutions about the center and locally modifying the surface of a movable disc, said movable disc being provided with supporting means and guiding means adapted for connection with the common driving means of said composite cam whereby the train of wave oscillations of said cam contour is constrained to travel lengthwise of said train past a cam follower mechanism.

21. In the combination of composite cam and cam follower mechanism as described in claim 12, incorporation of the polyphase set of waves in said composite cam wherein at least one component wave of said polyphase wave set is embodied in mechanical cam contour in spiral convolutions about the axis and locally modifying the cylindrical surface of a movable cylinder, said movable cylinder being provided with supporting means and guiding means adapted for connection with the common driving means of said composite cam whereby the train of wave oscillations of said cam contour is constrained to travel lengthwise of said train past a cam follower mechanism.

22. In combination, a composite cam and cam follower mechanism wherein relative displacement of a composite cam track past a cam follower mechanism engaged in transit with said track causes a corresponding rotary displacement of an element of said follower mechanism in conformity with such mathematical law of transmitted motion as the combined mechanism may be arbitrarily designed to reproduce; said composite cam comprising a movable tape wherein said cam incorporates two cam profiles along the two tape edges, respectively, sprocket holes in said tape along a line parallel to its longitudinal centerline, and a drive sprocket mounted on a fixed axis and provided with teeth to engage said sprocket holes whereby said tape is supported and guided in transport in arcuate contact with a portion of the cylindrical periphery of said drive sprocket with the edges of said tape overhanging the sides of said drive sprocket sufficiently to clear the cam profiles along said edges and further guided by simultaneous engagement of at least two adjacent sprocket holes of said tape with teeth of said drive sprocket, wherein said composite cam embodies a two-phase pair of trochoidal waves of arbitrary linear extent and constant but not necessarily identical amplitude, displaced in phase with respect to each other and modulated in wavelength so as to represent corresponding two-phase components of a vector of constant length rotating continuously at a non-uniform rate with respect to the longitudinal co-ordinate of the two-phase wave pair in conformity with said mathematical law of transmitted motion, the component waves of said two-phase pair of waves being embodied in two cam profiles along opposite edges of said movable tape, each component wave acting as pitchline for its respective cam profile with the longitudinal centerline of said pitchline parallel to the tape centerline and with equidistant clearance between said pitchline and said cam profile to accommodate a cam follower of circular cross section, said two cam profiles being aligned longitudinally in constant phase difference with respect to each other and with reference to any normal cross section of said tape and said tape being engaged in arcuate contact with said drive sprocket whereby said cam profiles co-operate in two-phase unison as a composite double-curve cam track guided in lengthwise transport past a cam follower mechanism engaged in transit with said composite cam track in the region of said arcuate contact; said cam follower mechanism comprising a two-phase pair of overhung cranks individually corresponding to the two component waves of said cam track, mounted and adapted for relative motion with respect to said cam track as described hereinafter, and coupled together mechanically so as to rotate in unison at phase intervals identical with corresponding phase intervals between said component waves, means to couple said pair of cranks with a driven load, and composite means to couple said pair of cranks phase-to-phase with the composite cam track, said composite means comprising separate parallel crankshafts for said cranks and individual coupling between each crank and a corresponding cam profile on the edge of the tape in its region of arcuate contact with the drive sprocket, including at least one cam follower spring adapted to apply spring pressure to said cranks so as to maintain said individual coupling, wherein each crank has a crankshaft with axis fixed in space perpendicular to the longitudinal centerline of the pitchline of its corresponding cam profile and perpendicular to the axis of said drive sprocket, a crankpin with axis parallel to the axis of said crankshaft at a radius of eccentricity equal to the wave amplitude of said pitchline and disposed to overhang the adjacent edge of said tape in said region of arcuate contact, said crankpin being provided with a co-axial cylindrical cam follower of radius equal to the equidistant clearance between said pitchline and said cam profile and of such axial disposition and length as to engage in constant tangent contact with said cam profile under said spring pressure applied to said crank at its crankpin so as to maintain said contact whereby the axis of said crankpin is constrained to intersect and follow said pitchline in conformity with the waveform and phase of the corresponding component wave and thereby to rotate said crank in synchronism with the wave oscillations of said cam profile as engaged in transit with said follower, the totality of said individual coupling co-operating in two-phase combination with the mutual coupling internal to said pair of cranks at such phase interval as to eliminate the mechanical disadvantage of any dead center condition and ensure an equable phase-distribution of driving torque whereby said cranks are constrained to rotate smoothly with passage of the composite cam track; said composite cam and cam follower mechanism co-operating as a mechanical coupling with varying transmission ratio by producing rotation of said cranks through one turn per cycle of two-phase wave travel of the composite cam track past the follower mechanism, the number of two-phase wave cycles or wavelengths per unit length of cam track varying along the cam track in conformity with said mathematical law of transmitted motion.

23. In combination, a composite cam and cam follower mechanism wherein relative displacement of a composite cam track past a cam follower mechanism engaged in transit with said track causes a corresponding rotary displacement of an element of said follower mechanism in conformity with such mathematical law of transmitted motion as the combined mechanism may be arbitrarily designed to reproduce; said composite cam comprising a pair of movable tapes wherein said cam incorporates four cam profiles along the four tape edges, respectively, sprocket holes in each tape along a line parallel to its longitudinal centerline, and at least one drive sprocket provided with individually fixed axial mounting and common drive and with teeth to engage said sprocket holes whereby said tapes are separately supported and guided in synchronized lengthwise transport, each tape being supported and guided in arcuate contact with a portion of the cylindrical periphery of a drive sprocket with the edges of said tape overhanging the sides of said drive sprocket sufficiently to clear the cam profiles along said edges and further guided by simultaneous engagement of at least two adjacent sprocket holes of said tape with teeth of said drive sprocket, wherein said composite cam embodies a four-phase set of trochoidal waves of arbitrary linear extent and constant but not necessarily identical amplitude, displaced in phase with respect to each other and modulated in wavelength so as to represent corresponding four-phase components of a vector of constant length rotating continuously at a non-uniform rate with respect to the longitudinal co-ordinate of the four-phase wave set in conformity with said mathematical law of transmitted motion, each component wave of said four-phase set of waves being embodied in cam profile along an edge of one of said movable tapes, said component wave acting as pitchline for said cam profile with the longitudinal centerline of said pitchline parallel to the tape centerline and with equidistant clearance between said pitchline and said cam profile to accommodate a cam follower of circular cross section, said four-phase set of waves being so embodied along the four edges of said pair of tapes, the two component wave cam profiles on each tape being aligned longitudinally in constant phase difference with respect to each other and with reference to any normal cross section of said tape and said pair of tapes being engaged in arcuate contact with said at least one drive sprocket in further constant phase alignment whereby the totality of component wave cam profiles co-operates in four-phase unison as a composite quadruple-curve cam track guided in lengthwise transport past a cam follower mechanism engaged in transit with said composite cam track in the region of said arcuate contact; said cam follower mechanism comprising a four-phase set of four overhung cranks individually corresponding to the four component waves of said cam track, mounted and adapted for relative motion with respect to said cam track as described hereinafter, and coupled together mechanically so as to rotate in unison at phase intervals identical with corresponding phase intervals between said component waves, means to couple said set of cranks with a driven load, and composite means to couple said set of cranks phase-to-phase with the composite cam track, said composite means comprising separate parallel crankshafts for the pair of cranks corresponding to a pair of component waves embodied in a single tape and individual coupling between each crank and a corresponding cam profile on the edge of a tape in its region of arcuate contact with a drive sprocket wherein said crank has a crankshaft with axis fixed in space perpendicular to the longitudinal centerline of the pitchline of said cam profile and perpendicular to the axis of said drive sprocket, a crankpin with axis parallel to the axis of said crankshaft at a radius of eccentricity equal to the wave amplitude of said pitchline and disposed to overhang the adjacent edge of said tape in the region of said arcuate contact, said crankpin being provided with a co-axial cylindrical cam follower of radius equal to the equidistant clearance between said pitchline and said cam profile and of such axial disposition and length as to engage in constant tangent contact with said cam profile whereby the axis of said crankpin is constrained to intersect and follow said pitchline in conformity with the waveform and phase of the corresponding component wave and thereby to rotate said crank in synchronism with the wave oscillations of said cam profile as engaged in transit with said follower, the totality of said individual coupling co-operating in four-phase combination with the mutual coupling internal to said set of four cranks at such phase intervals as to maintain constant tangent contact between all four cam followers and their respective cam profiles, eliminate the mechanical disadvantage of any dead center condition, and ensure an equable phase-distribution of driving torque wherein at least one crank is always driven by a rising portion of the corresponding cam profile, whereby said cranks are constrained to rotate smoothly with passage of the composite cam track; said composite cam and cam follower mechanism co-operating as a mechanical coupling with varying transmission ratio by producing rotation of said cranks through one turn per cycle of four-phase wave travel of the composite cam track past the follower mechanism, the number of four-phase wave cycles or wavelengths per unit length of cam track varying along the cam track in conformity with said mathematical law of transmitted motion.

ROBERT L. KENNGOTT.

No references cited.